United States Patent
Kimura et al.

(10) Patent No.: US 10,265,847 B2
(45) Date of Patent: Apr. 23, 2019

(54) ACTION TRANSFER DEVICE, ACTION TRANSFER METHOD, AND NON-TRANSITORY COMPUTER-READABLE MEDIUM STORING PROGRAM

(71) Applicant: SOINN Holdings LLC, Kodaira-shi (JP)

(72) Inventors: Daiki Kimura, Tokyo (JP); Osamu Hasegawa, Tokyo (JP)

(73) Assignee: SOINN HOLDINGS LLC, Tokyo (JP)

( * ) Notice: Subject to any disclaimer, the term of this patent is extended or adjusted under 35 U.S.C. 154(b) by 183 days.

(21) Appl. No.: 15/525,730

(22) PCT Filed: Dec. 2, 2015

(86) PCT No.: PCT/JP2015/005981
§ 371 (c)(1),
(2) Date: May 10, 2017

(87) PCT Pub. No.: WO2016/088367
PCT Pub. Date: Jun. 9, 2016

(65) Prior Publication Data
US 2017/0326727 A1  Nov. 16, 2017

(30) Foreign Application Priority Data
Dec. 2, 2014 (JP) .................. 2014-243740

(51) Int. Cl.
*B25J 9/16* (2006.01)
*G06N 3/02* (2006.01)
*G06N 5/00* (2006.01)

(52) U.S. Cl.
CPC .............. *B25J 9/1605* (2013.01); *G06N 3/02* (2013.01); *G06N 5/00* (2013.01);
(Continued)

(58) Field of Classification Search
CPC .................. B25J 9/1605; B25J 9/1682; G05B 2219/33029; G05B 2219/33045;
(Continued)

(56) References Cited

U.S. PATENT DOCUMENTS

| 5,495,410 A | 2/1996 | Graf |
| 5,880,956 A | 3/1999 | Graf |

(Continued)

FOREIGN PATENT DOCUMENTS

| JP | 8-69314 A | 3/1996 |
| JP | 2001-51713 A | 2/2001 |

(Continued)

OTHER PUBLICATIONS

Botond Bocsi et al., "Alignment-based Transfer Learning for Robot Models," accessed Oct. 6, 2014, <http://www.cs.ubbcluj.ro/~bboti/pubs/ijcnn_2013.pdf>, 2013.

(Continued)

*Primary Examiner* — Dale Moyer
(74) *Attorney, Agent, or Firm* — Snyder, Clark, Lesch & Chung, LLP

(57) ABSTRACT

A transfer source operation information acquisition unit acquires a plurality of pieces of action information about the transfer source robot; a transfer destination operation information acquisition unit acquires a plurality of pieces of first action information about the transfer destination robot; and a correction unit generates a plurality of pieces of second action information about the transfer destination robot by correcting action information about the transfer source robot by a prescribed update formula using the first action information about the transfer destination robot. The number of the pieces of the first action information about the transfer destination robot is smaller than the number of the pieces of the action information about the transfer source robot, and (Continued)

TRANSFER SOURCE ROBOT
(SIMULATOR etc.)

TRANSFER DESTINATION ROBOT
(REAL ROBOT)

LARGE AMOUNT OF ACTION INFORMATION → TRANSFER → ACTION INFORMATION INCLUDED IN OTHER ROBOTS CAN BE EXECUTED WITH SMALL NUMBER OF TRIALS the number of the pieces of the second action information about the transfer destination robot is larger than the number of the pieces of the first action information about the transfer destination robot.

8 Claims, 19 Drawing Sheets

(52) U.S. Cl.
CPC .............. *G05B 2219/33029* (2013.01); *G05B 2219/33045* (2013.01); *G05B 2219/39296* (2013.01)

(58) Field of Classification Search
CPC ........... G05B 2219/39139; G05B 2219/39296; G05B 2219/39299
See application file for complete search history.

(56) References Cited

U.S. PATENT DOCUMENTS

| | | | |
|---|---|---|---|
| 6,272,396 B1 | 8/2001 | Taitler | |
| 2007/0146371 A1* | 6/2007 | Dariush | B25J 9/1602 345/474 |
| 2007/0162164 A1* | 7/2007 | Dariush | B25J 9/1602 700/61 |
| 2007/0255454 A1* | 11/2007 | Dariush | G06N 3/008 700/245 |
| 2009/0234499 A1* | 9/2009 | Nielsen | B25J 9/161 700/250 |
| 2010/0250001 A1* | 9/2010 | Hodgins | B62D 57/032 700/261 |
| 2014/0309762 A1* | 10/2014 | Hayata | B25J 9/1682 700/114 |
| 2016/0023355 A1* | 1/2016 | Komatsu | B25J 9/1682 700/248 |
| 2016/0243704 A1* | 8/2016 | Vakanski | B25J 9/1664 |
| 2016/0279788 A1* | 9/2016 | Kanaoka | B25J 3/04 |
| 2018/0107175 A1* | 4/2018 | Ha | G05B 13/0255 |

FOREIGN PATENT DOCUMENTS

| | | | | |
|---|---|---|---|---|
| JP | 2007-276052 A | 10/2007 | | |
| JP | 2011-110621 A | 6/2011 | | |
| WO | WO-2018084164 A1 * | 5/2018 | | B25J 9/16 |

OTHER PUBLICATIONS

Kohonen T., "Self-organized formation of topologically correct feature maps," Biological Cybernetics vol. 43, pp. 59-69, 1982.

Shen F., Hasegawa O., "A Fast Nearest Neighbor Classifier Based on Self-organizing Incremental Neural Network," Neural Networks, 2008.

International Search Report issued in corresponding International Application No. PCT/JP2015/005981 dated Jan. 19, 2016, 9 pages.

Balaji Lakshmanan et al.: "Transfer learning across heterogeneous robots with action sequence mapping", Intelligent Robots and Systems (IROS), 2010 IEEE/RSJ International Conference on, IEEE, Piscataway, NJ, USA, Oct. 18, 2010, pp. 3251-3256.

Osamu Hasegawa et al.: "Home Robots, Learn by Themselves", Universal Access in Human-Computer Interaction, Applications and Services for Quality of Life, Springer Berlin Heidelberg, Berlin, Jul. 21, 2013, pp. 48-53.

D Kimura: "Knowledge Transfer on Robots", Tokyo, Japan, Sep. 25, 2015, pp. 1-143, retrieved at <http://t2r2.star.titech.ac.jp/rrws/file/CTT100695875/ATD100000413/>, retrieved on Aug. 15, 2018.

Makondo Ndivhuwo et al.: "Knowledge transfer for learning robot models via Local Procrustes Analysis", 2015 IEEE-RAS 15th International Conference on Humanoid Robots (Humanoids), IEEE, Nov. 3, 2015, pp. 1075-1082.

Extended European Search Report issued in corresponding European Application No. 15865660.3, dated Aug. 28, 2018, 16 pages.

* cited by examiner

1: $t \leftarrow 1$
2: $\hat{\mathbf{D}}_{tgt} \leftarrow \mathbf{D}_{src}$
3: for all $\langle \vec{j}_{tgt}, \vec{x}_{tgt} \rangle \in \mathbf{D}_{tgt}$ do
4: $\quad a \leftarrow a_s + 9a_s t/\text{num}(\mathbf{D}_{tgt})$
5: $\quad b \leftarrow b_s + 9b_s t/\text{num}(\mathbf{D}_{tgt})$
6: $\quad \vec{j}_{nearest} \leftarrow$ nearest data to $\vec{j}_{tgt}$ in $\hat{\mathbf{J}}_{tgt}$
7: $\quad \vec{x}_{nearest} \leftarrow$ search pair with $\vec{j}_{nearest}$ in $\hat{\mathbf{D}}_{tgt}$
8: $\quad d_{nearest} \leftarrow \|\vec{x}_{tgt} - \vec{x}_{nearest}\|$
9: $\quad$ for all $\langle \vec{j}_i, \vec{x}_i \rangle \in \hat{\mathbf{D}}_{tgt}$ do
10: $\quad\quad d_j \leftarrow \|\vec{j}_{tgt} - \vec{j}_i\|$
11: $\quad\quad \Delta \vec{x}_i \leftarrow \vec{x}_{tgt} - \vec{x}_i$
12: $\quad\quad \vec{x}_i \leftarrow \vec{x}_i + 4\,sgm(a, -d_j)\,sgm(b, -d_{nearest})\,\Delta\vec{x}_i$
13: $\quad$ end for
14: $\quad t \leftarrow t + 1$
15: end for

Fig. 3

1: $t \leftarrow 1$
2: $\hat{\mathbf{D}}_{tgt} \leftarrow \mathbf{D}_{src}$
3: for all $(\vec{j}_{tgt}, \vec{x}_{tgt}) \in \mathbf{D}_{tgt}$ do
4:    $a \leftarrow a_e + 9a_e t / \text{num}(\mathbf{D}_{tgt})$
5:    $\vec{j}_{nearest} \leftarrow$ nearest data to $\vec{j}_{tgt}$ in $\hat{\mathbf{J}}_{tgt}$
6:    $\vec{x}_{nearest} \leftarrow$ search pair with $\vec{j}_{nearest}$ in $\hat{\mathbf{D}}_{tgt}$
7:    $\Delta \vec{x}_{nearest} \leftarrow \vec{x}_{tgt} - \vec{x}_{nearest}$
8:    for all $(\vec{j}_i, \vec{x}_i) \in \hat{\mathbf{D}}_{tgt}$ do
9:      $d_j \leftarrow \|\vec{j}_{tgt} - \vec{j}_i\|$
10:      $\vec{x}_i \leftarrow \vec{x}_i + 2\, sgm(a, -d_j)\, \Delta \vec{x}_{nearest}$
11:    end for
12:    $t \leftarrow t + 1$
13: end for

Fig. 5

| Robot | Src | A | B | C |
|---|---|---|---|---|
| Arm 1 | 0.8 | 0.9 | 1.0 | 1.5 |
| Arm 2 | 1.2 | 1.1 | 1.0 | 1.0 |

Fig. 7

|   |    | Average ± Standard Deviation | | |
|---|----|------------------|------------------|------------------|
|   |    | Robot A          | Robot B          | Robot C          |
| L | ST | 0.20 ± 0.15      | 0.20 ± 0.15      | 0.25 ± 0.18      |
| L | BS | 0.11 ± 0.06      | 0.22 ± 0.12      | 0.50 ± 0.31      |
| L | TS | 0.28 ± 0.19      | 0.26 ± 0.18      | 0.31 ± 0.21      |
| L | TE | 0.02 ± 0.02      | 0.04 ± 0.03      | 0.07 ± 0.06      |
| L | BT | 0.01 ± 0.00      | 0.01 ± 0.00      | 0.01 ± 0.01      |
| N | ST | 0.26 ± 0.19      | 0.26 ± 0.19      | 0.33 ± 0.24      |
| N | BS | 0.12 ± 0.06      | 0.24 ± 0.12      | 0.51 ± 0.32      |
| N | TS | 0.26 ± 0.17      | 0.27 ± 0.17      | 0.43 ± 0.24      |
| N | TE | 0.04 ± 0.03      | 0.08 ± 0.07      | 0.13 ± 0.12      |
| N | BT | 0.01 ± 0.00      | 0.01 ± 0.00      | 0.01 ± 0.00      |

Fig. 8

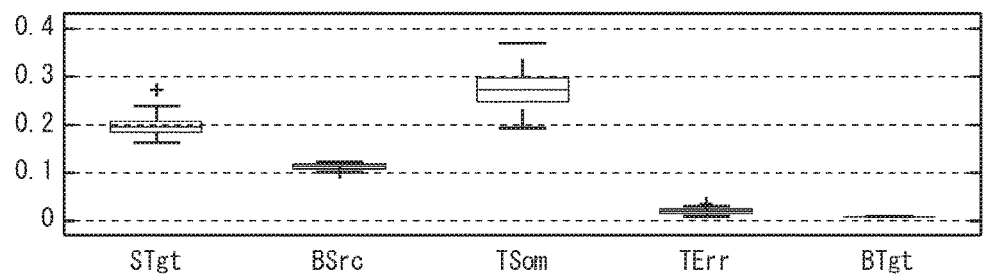
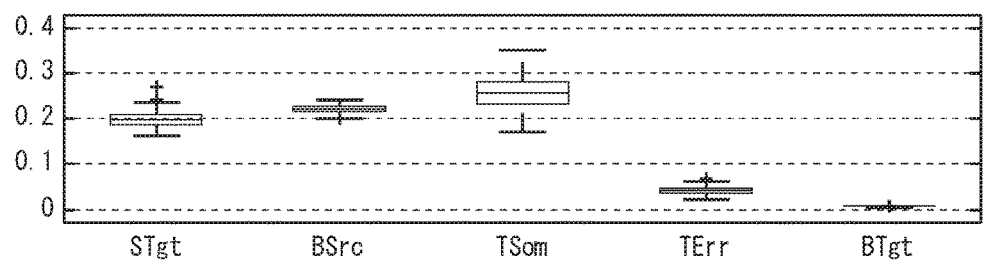
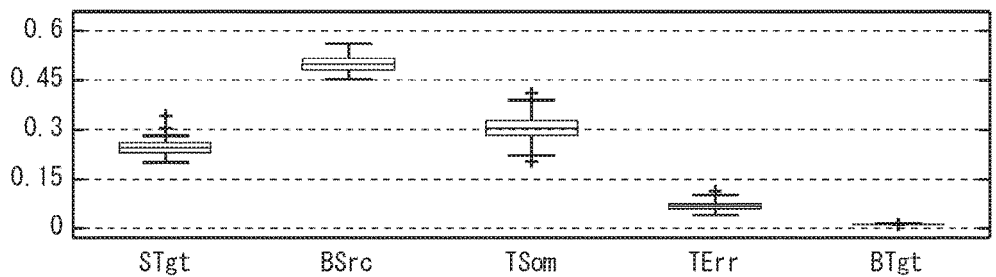
Fig. 9

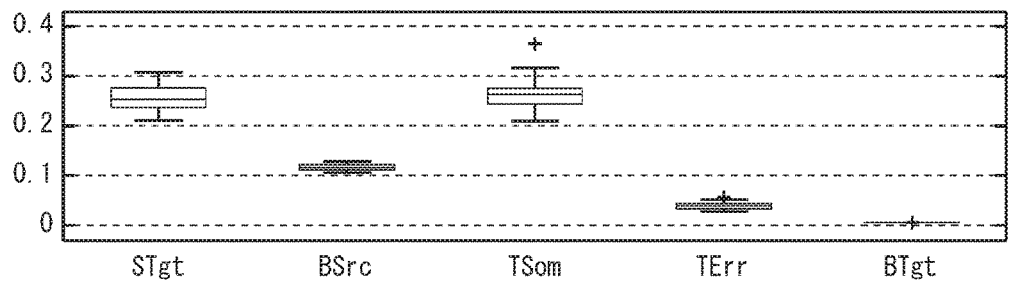
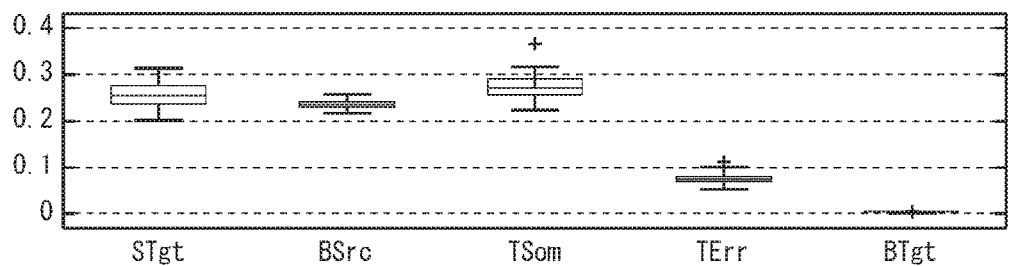
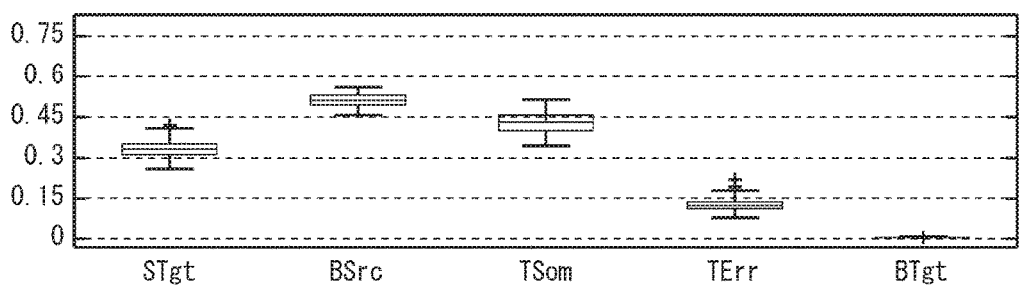
Fig. 10

|  | Smlt-$\alpha$ | Smlt-$\beta$ | Real |
|---|---|---|---|
| Arm 1<br>b/w $jnt_2$ and $jnt_3$ | 20 cm | 20 cm | 25 cm |
| Arm 2<br>b/w $jnt_3$ and $jnt_4$ | 15 cm | 20 cm | 22 cm |
| Wrist<br>b/w $jnt_5$ and $jnt_6$ | 10 cm | 10 cm | 9 cm |

Fig. 13

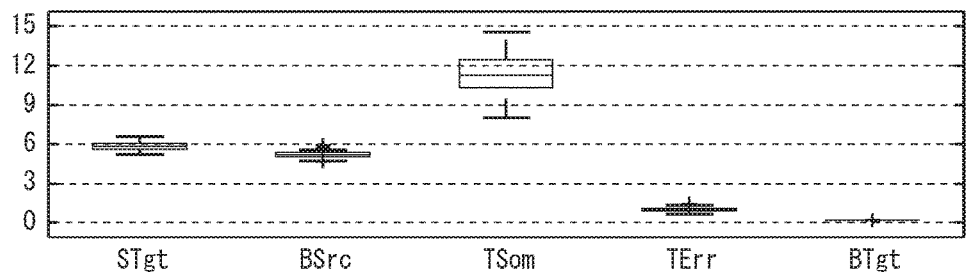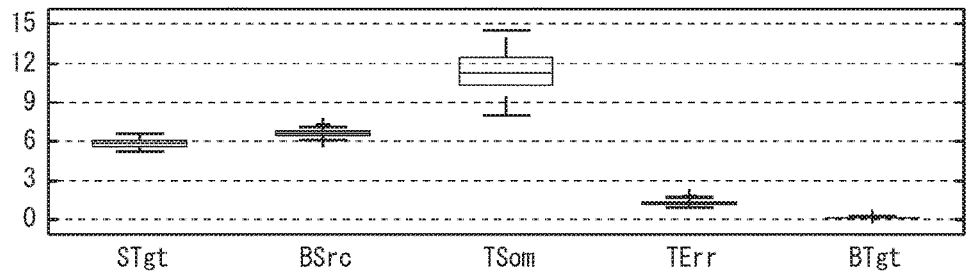
Fig. 14

|    | Average ± Standard Deviation [cm] ||
|    | By robot α on smlt. | By robot β on smlt. |
| --- | --- | --- |
| ST | 5.85 ± 2.92 | 5.85 ± 2.92 |
| BS | 5.19 ± 2.43 | 6.58 ± 2.62 |
| TS | 11.31 ± 5.02 | 11.31 ± 5.02 |
| TE | 0.96 ± 0.53 | 1.26 ± 0.66 |
| BT | 0.20 ± 0.07 | 0.20 ± 0.07 |

Fig. 15

1: $\mathbf{X}_{knn} \leftarrow \text{knn}(\mathbf{X}, \vec{x}_{goal}, 3k)$
2: $\vec{x}_{one} \leftarrow \text{knn}(\mathbf{X}, \vec{x}_{goal}, 1)$
3: $\mathbf{J}_{knn} \leftarrow$ find each joints value of $\mathbf{X}_{knn}$ from $\mathbf{D}$
4: $\vec{j}_{one} \leftarrow$ find joints value for $\vec{x}_{one}$ from $\mathbf{D}$
5: $\mathbf{J}_{selected} \leftarrow \text{knn}(\mathbf{J}_{knn}, \vec{j}_{one}, k)$
6: $\mathbf{X}_{selected} \leftarrow$ find each end-effector of $\mathbf{J}_{selected}$ from $\mathbf{D}$
7: $\vec{j}_{ik} \leftarrow 0, \vec{w}_{sum} \leftarrow 0$
8: for all $(\vec{j}_i, \vec{x}_i) \in (\mathbf{J}_{selected}, \mathbf{X}_{selected})$ do
9:     $\vec{w} \leftarrow 1/\mathbf{max}(\|\vec{j}_{one} - \vec{j}_i\| + \|\vec{x}_{goal} - \vec{x}_i\|, \varepsilon)$
10:    $\vec{w}_{sum} \leftarrow \vec{w}_{sum} + \vec{w}$
11:    $\vec{j}_{ik} \leftarrow \vec{j}_{ik} + \vec{j}_i/\vec{w}$
12: end for
13: $\vec{j}_{ik} \leftarrow \vec{j}_{ik}/\vec{w}_{sum}$

Fig. 19

ACTION TRANSFER DEVICE, ACTION TRANSFER METHOD, AND NON-TRANSITORY COMPUTER-READABLE MEDIUM STORING PROGRAM

TECHNICAL FIELD

The present invention relates to an action transfer device, an action transfer method, and a program. For example, the present invention relates to a technique for transferring an action from a transfer source robot by using a small number of learning samples acquired by a transfer destination robot.

BACKGROUND ART

Currently, the use of robots has been expanding in human society including in the home. At present, an intellectual development mechanism for robots is still being developed, and thus actions that can be executed by robots and things that can be understood by robots are limited. On the other hand, various types of robots having different body characteristics have been developed. Assuming that such robots having the above limitations are introduced into the standard home, it would be inefficient to cause each of these robots to learn actions and the like independently.

Accordingly, there is a need for a mechanism for sharing the knowledge learned by each robot, in particular, action information, among other robots. The technique for obtaining an action by sharing action information among robots is referred to as "action transfer". In other words, the action transfer is a technique in which a transfer destination (target domain) robot efficiently learns an action by using action information obtained by a transfer source (source domain) robot.

Information (action information) based on which a robot acts can be considered as, for example, being information obtained by accumulating correspondence relations between a joint angle (joint value) and coordinates (end effector) of a leading end of an arm of a robot having certain physical properties (e.g., the length of an arm, or the number of joints). The use of such action information enables the robot to act. Accordingly, the physical properties have an important effect on the robot action transfer. However, it is difficult to identify the physical properties of a robot among various types of robots. Therefore, a mechanism for adapting action information obtained from another robot to the physical properties of the robot is important in the action transfer.

As the above mechanism, a technique in which physical properties of a transfer destination robot are obtained and then action information about a transfer destination robot is processed to be adapted to the physical properties of the transfer source robot is generally employed. However, in this technique, some advance preparation such as measurement of physical properties of the transfer destination robot is required. Further, if the physical properties of the transfer destination robot are changed, or if an error occurs in the measurement thereof, it is difficult to perform an action accurately. Furthermore, humans and animals can learn actions without obtaining information about their own physical properties in advance. Considering this, it seems to be a more realistic approach to achieve an action transfer based on experiences of a real robot, without obtaining information about the physical properties of the transfer destination robot in advance.

In this regard, Non Patent Literature 1 proposes a technique for transferring action samples of a transfer source robot to a transfer destination robot by using the respective numbers of action samples acquired from both the transfer source robot and the transfer destination robot that are the same as each other even when some of the physical properties of the transfer destination robot are unknown. Note that in this case, the transfer is achieved by fitting using a matrix calculation.

CITATION LIST

Non Patent Literature

Non Patent Literature 1: Botond Bocsi, and two others, "Alignment-based Transfer Learning for Robot Models", [online], 2013, [searched on Oct. 6, 2014], URL: http://www.cs.ubbcluj.ro/~bboti/pubs/ijcnn_2013.pdf

SUMMARY OF INVENTION

Technical Problem

However, Non Patent Literature 1 fails to describe details regarding the number of data samples required for the action transfer. It is considered that it is necessary to acquire the respective numbers of action samples from both the transfer source robot and the transfer destination robot that are the same as each other. Specifically, the technique needs to acquire a large number of learning samples not only in the transfer source but also in the transfer destination. This causes a problem that it takes a large amount of time for the technique to perform action transfer, it takes a large number of man-hours, cost, and the like, and it is difficult to achieve the action transfer rapidly and accurately.

In general, the use of a real robot on a simulator or in an experiment facility, or the like as a transfer source robot makes it relatively easy to acquire a large number of action samples. However, it is assumed that the transfer destination robot is a real robot provided for an actual operation at home or the like. Under such a situation, it is considered that it is difficult to acquire a number of learning samples the same as that of the transfer source robot. Accordingly, in the transfer destination robot, a mechanism for achieving the action transfer with high efficiency without the step of acquiring a large number of learning samples is required.

The present invention has been made to solve the above-mentioned problems, and an object of the present invention is to provide an action transfer device, an action transfer method, and a program which are capable of performing an action transfer from a transfer source robot by using a small number of learning samples acquired by a transfer destination robot.

Solution to Problem

An action transfer device according to the present invention includes: a transfer source action information acquisition unit configured to acquire a plurality of pieces of action information about a transfer source robot; a transfer destination action information acquisition unit configured to acquire a plurality of pieces of first action information about a transfer destination robot; and a correction unit configured to generate a plurality of pieces of second action information about the transfer destination robot by correcting the action information about the transfer source robot by a prescribed update formula using the first action information about the transfer destination robot. The number of the pieces of the first action information about the transfer destination robot is smaller than the number of the pieces of the action information about the transfer source robot, and the number of the pieces of the second action information about the transfer destination robot is larger than the number of the pieces of the first action information about the transfer destination robot.

An action transfer method according to the present invention includes: a transfer source action information acquisition step of acquiring a plurality of pieces of action information about a transfer source robot; a transfer destination action information acquisition step of acquiring a plurality of pieces of first action information about a transfer destination robot; and a correction step of generating a plurality of pieces of second action information about the transfer destination robot by correcting the action information about the transfer source robot by a prescribed update formula using the first action information about the transfer destination robot. The number of the pieces of the first action information about the transfer destination robot is smaller than the number of the pieces of the action information about the transfer source robot, and the number of the pieces of the second action information about the transfer destination robot is larger than the number of the pieces of the first action information about the transfer destination robot.

A program according to the present invention is a program for causing a computer to execute the action transfer method described above.

In the present invention, the action transfer device modifies a large number of data sets about the transfer source robot (action information about the transfer source robot) by using a small number of action samples (first action information about the transfer destination robot) acquired by the transfer destination robot, thereby generating a large number of data sets (second action information about the transfer destination robot) that are optimized by the transfer destination robot. Thus, the action of the transfer source robot can be transferred to the transfer destination robot without obtaining a large number of action samples in the transfer destination robot.

Advantageous Effects of Invention

According to the present invention, it is possible to provide an action transfer device, an action transfer method, and a program which are capable of performing an action transfer from a transfer source robot by using a small number of learning samples acquired by a transfer destination robot.

BRIEF DESCRIPTION OF DRAWINGS

FIG. 3 is a diagram showing an example of an action algorithm of the action transfer device 100 according to the first embodiment;

FIG. 5 is a diagram showing an example of an action algorithm of the action transfer device 100 according to the second embodiment;

FIG. 7 is a table showing physical properties of a robot used for a comparative experiment;

FIG. 8 is a table showing results of comparative experiments;

FIG. 9 is a diagram showing results of comparative experiments;

FIG. 10 is a diagram showing results of comparative experiments;

FIG. 13 is a table showing physical properties of the robot used for the comparative experiment;

FIG. 14 is a diagram showing results of comparative experiments;

FIG. 15 is a diagram showing results of comparative experiments;

FIG. 19 is a diagram showing an example of an algorithm for obtaining joint values for causing an arm to perform an action using a data set.

DESCRIPTION OF EMBODIMENTS

<Introductory Information>

Prior to the description of the invention, conditions under which an action transfer method according to the present invention is implemented will be described.

Figure 18:
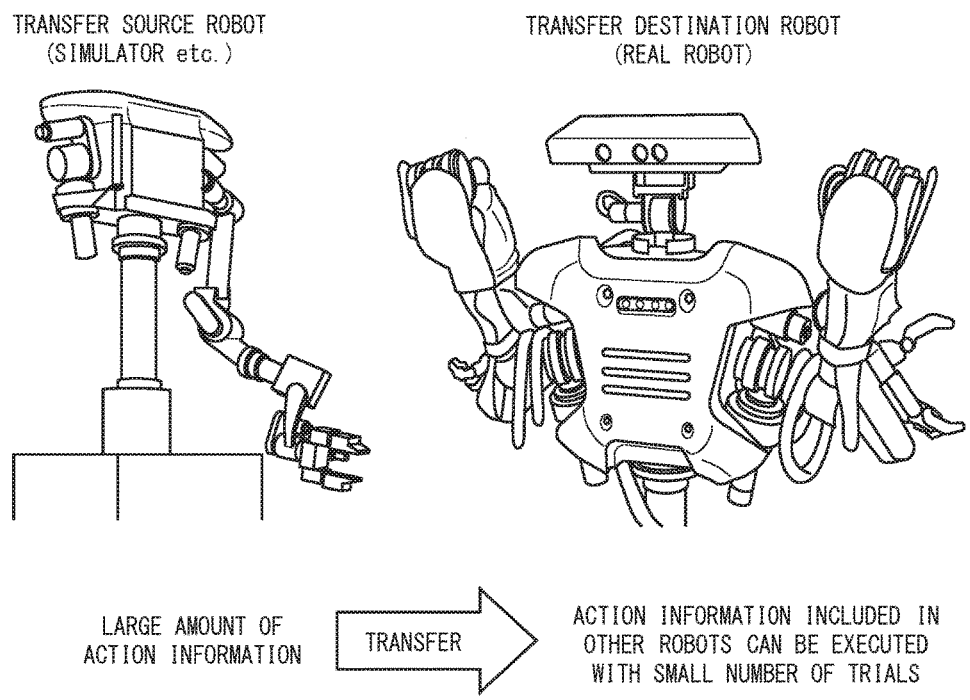
FIG. 18 is a conceptual diagram showing a transfer of an action according to the present invention.

The present invention proposes a technique for implementing an action transfer between robots under the following conditions (FIG. 18). Embodiments of the present invention described below are also implemented under the following conditions. Note that the action of the robot refers to an operation for moving a specific part of the robot, such as an end effector of an arm (a tip end of an arm which corresponds to a hand of a human) to an arbitrary location (coordinate value).

Condition 1: The number of joints of a transfer source robot and the number of joints of a transfer destination robot are known and equal to each other.

Condition 2: Physical properties (e.g., the length of an arm) other than the number of joints are unknown.

Condition 3: The transfer source robot can extract a large number of action samples. The transfer source robot is typically a robot that is present on a simulator or in an experiment facility.

Condition 4: The transfer destination robot can extract only a small number of action samples. The transfer destination robot is typically a real robot In the technique according to the present invention, an action is transferred to the transfer destination robot from the transfer source robot that satisfies the above-mentioned restrictive conditions. The action transfer indicates that an experiment database $\hat{D}_{tgt}$ corresponding to a work space for the transfer destination robot is created from an action experiment database $D_{src}$ created on the transfer source robot. At this time, $\hat{D}_{tgt}$ is created by first causing the transfer destination robot to perform a small number of actions to create an experiment data set $D_{tgt}$ and then correcting $D_{src}$ by $D_{tgt}$. In this case, the size of $D_{tgt}$ is smaller than the size of $D_{src}$, and the size of $\hat{D}_{tgt}$ is the same as the size of $D_{src}$. Thus, according to this technique, learning can be achieved using a smaller number of data sets than when data sets are generated by causing the transfer destination robot to actually perform a large number of actions. Further, the accuracy is improved as compared with a case where $D_{src}$ is copied to create $\hat{D}_{tgt}$.

Note that the experiment database, such as $D_{src}$, may be a simple set of pairs of joint values and coordinate values. In addition to a simple database (a database recording information about a simple set of pairs of joint values and coordinate values), for example, a database obtained by compressing information using SOM (Self Organizing Maps) by competitive learning, SOINN (Self Organizing Incremental Neural Network) which is a technique for online unsupervised learning capable of additional learning by modifying the SOM, or the like.

Note that the SOM and the COINN are described in the following Reference 1 and Reference 2, and thus detailed descriptions thereof are omitted.

(Reference 1) Kohonen T., "Self-organized formation of topologically correct feature maps", Biological Cybernetics Vo. 43, pp. 59-69, 1982

(Reference 2) Shen F., Hasegawa O., "A Fast Nearest Neighbor Classifier Based on Self-organizing Incremental Neural Network" Neural Networks, 2008

A method for creating an experiment database D for actions on robots will now be described. This method can be applied to the creation of $D_{src}$ and $D_{tgt}$. In general, when the physical properties of robots are known, the use of a well-known technique of Inverse Kinematics (IK) makes it possible to control the end effector of the arm to be moved to an arbitrary location. However, the physical properties are unknown in the current assumption. Accordingly, in the technique according to the present invention, IK based on experiences is carried out to thereby move the end effector. Data to be acquired by the robot so as to execute the IK based on experiences and a method for executing the IK using the data are disclosed below.

First, the following joint value set which is data indicating joint angles of all joints of the target robot $J=\{\vec{J}_1, \vec{J}_2, \ldots, \vec{J}_n | \vec{J}_i \ni \text{each joint value}\}$ is generated. For example, in the case of an m-axis robot, i.e., a robot having m joints, the following joint value $\vec{J}_i$ is represented by an m-dimensional vector.

Further, the robot is caused to actually act using the joint values included in J, and absolute coordinate values (hereinafter referred to simply as coordinate values) of the end effector of the arm are obtained by various sensor information (e.g., visual information) about the robot. When the physical properties of the robot on the simulator or the like are known, the use of Forward Kinetics makes it possible to reduce a time required to acquire the coordinate values. Further, the following data set indicating the calculated coordinate values is generated.

$$X=\{\vec{x}_1, \vec{x}_1, \ldots, \vec{x}_n\}(\vec{x}_i \text{ IS XY-PLANE OR XYZ SPACE})$$

At this time, the coordinate values of the end effector are uniquely determined from the joint values of the robot. In other words, there is a functional relation between the joint values and the coordinate values.

The joint values and the coordinate values which are acquired from these experiences, or actual actions, are represented by a data set D (Formulas (1) and (2)).

$$D=\langle J,X\rangle \ni \langle \vec{J}_i, \vec{x}_i\rangle \quad (1)$$

$$\text{each } \vec{x}_i = f(\vec{J}_i) \quad (2)$$

In this case, on the basis of the acquired data set D, a method for obtaining the following joint value $\vec{J}_{ik}$ for moving the end effector of the arm to the coordinate value $\vec{x}_{goal}$ which is randomly designated is described. In this case, k pieces of coordinate value data in the vicinity of the designated coordinate value $\vec{x}_{goal}$ are searched from the data set D, and inverse distance weighted average of the joint values $\vec{J}_i$ respectively corresponding to the k coordinate values is calculated to thereby obtain $\vec{J}_{ik}$.

In this case, a plurality of joint values that allow the end effector to move to the designated coordinate value may be present. This event is more likely to occur as the number of joints increases. Accordingly, even when the coordinate values are similar values, the joint values for reaching the respective coordinate values may greatly differ from each other. In this case, if an average value is calculated using only the coordinate value space, the average of the joint values that greatly differ from each other is used, which results in an increase in positional error. Accordingly, in this technique, $\vec{J}_{ik}$ is calculated referring to the distance between the joint values in the joint value space.

Specifically, first, in the coordinate value space, $\vec{x}_{one}$ which is located closest to the designated coordinate value, and a peripheral coordinate value sample $X_{km}$ thereof are searched. Then, joint values ($\vec{J}_{one}, J_{km}$) which respectively correspond to the searched coordinate values are obtained. Further, data $J_{selected}$ which is closer to $\vec{J}_{one}$ is searched among the joint values $J_{km}$. Then, inverse distance weighted average for the values is represented by $\vec{J}_{ik}$.

This algorithm is shown in FIG. 19. Note that a parameter k is set to 3 in this technique.

Subsequently, the embodiment of the present invention discloses two types of methods for correcting $D_{src}$, which is acquired by the transfer source robot, to thereby obtain $\hat{D}_{tgt}$, that is, a data set to be adapted to the work space for the transfer destination robot. First, Transfer by SOM-algorithm is disclosed as a first embodiment. Next, Transfer by Error propagation is disclosed as a second embodiment.

<First Embodiment>

Transfer by SOM-algorithm according to the first embodiment is a method for acquiring a small number of action samples $D_{tgt}$ in the transfer destination robot and modifying a coordinate value space $X_{src}$ for the transfer source robot by using data $X_{tgt}$ of the coordinate value space in $D_{tgt}$ and an update formula created with reference to the SOM.

Transfer by SOM-algorithm is an algorithm conceived from the update formula with reference to the conventionally known SOM (Self Organizing Maps). The SOM indicates self organizing maps devised by Kohonen et al. as a technique for changing a network structure (topology) according to an input. The SOM is one type of artificial neural networks and has a mechanism for modifying a topology of neurons according to an input. The SOM learning method is competitive learning, and neurons in the vicinity of the input are updated.

On the other hand, since setting of a target problem in the conventional SOM differs from setting of a target problem in the Transfer by SOM-algorithm, a new finding is added to the method of changing an update ratio in the Transfer by SOM-algorithm. In the conventional SOM, a node in one space is updated and the update ratio is determined using the distance between the input and a neighboring node of the input in the space. On the other hand, Transfer by SOM-algorithm is based on the premise that two spaces, i.e., a joint value space and an end effector coordinate space, are present. In this method, the coordinate value space is appropriate as the space in which updating is performed depending on input data. However, as described above, since constant restrictive conditions are present between the coordinate values and the joint values, it is important to consider the distance between the joint values in the joint value space. Therefore, in this method, a mechanism in which the distance between the joint values in the joint value space can be reflected in the update ratio of the coordinate value space is provided.

A detailed method for obtaining $\hat{D}_{tgt}$ using Transfer by SOM-algorithm is disclosed below.

Figure 1:
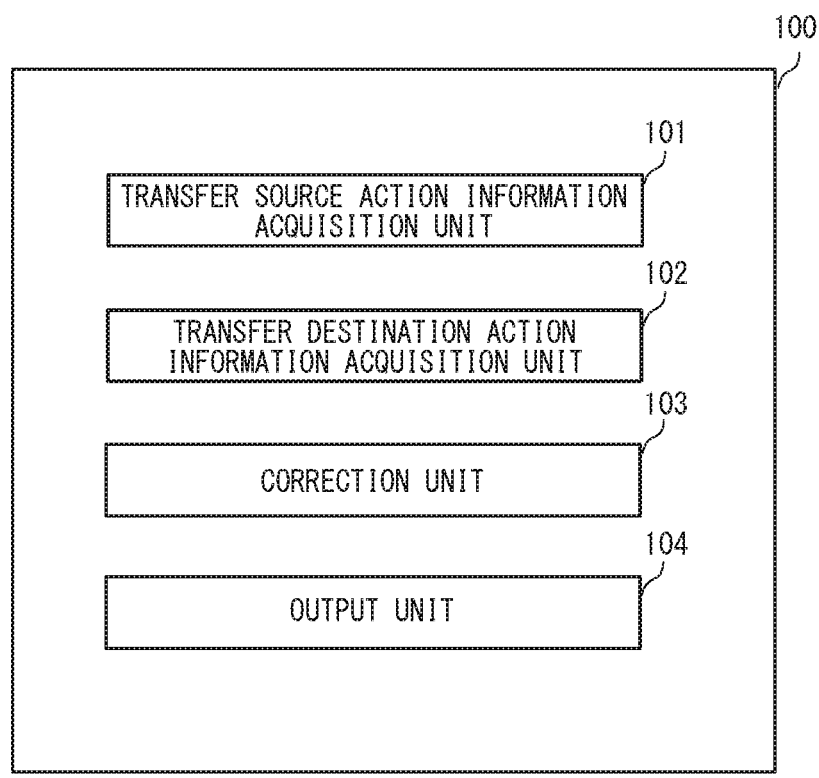
FIG. 1 is a diagram showing a configuration of an action transfer device 100 according to a first embodiment.

Referring first to FIG. 1, a configuration of an action information transfer device 100 according to the first embodiment of the present invention will be described.

The action transfer device 100 is an information processing device which is typically a server computer, a personal computer (PC), or the like. The typical action transfer device 100 includes an arithmetic processing unit, a volatile or non-volatile storage device, and an input/output device. The arithmetic processing unit executes various controls based on programs stored in the storage device, thereby logically implementing each processing unit to be described later. The action transfer device 100 is not necessarily a physically single device, but instead may be implemented by dispersion processing using a plurality of information processing devices. Further, the action transfer device 100 may be incorporated in, for example, the transfer destination robot, or may be separated from the transfer destination robot.

A transfer source action information acquisition unit 101 acquires the data set $D_{src}$ for causing the transfer source robot to act. $D_{src}$ includes a joint value group $J_{src}$ and a coordinate value group $X_{src}$ of the end effector. Typically, $D_{src}$ is generated by causing the transfer source robot to act several times on the simulator or in the experiment facility and acquiring a large number of pairs of the end effector and the joint value corresponding to the end effector. Assume in this embodiment that $D_{src}$ is generated in advance and the transfer source action information acquisition unit 101 acquires $D_{src}$ from the input device or the storage device.

A transfer destination action information acquisition unit 102 acquires the data set $D_{tgt}$ obtained when the transfer destination robot is caused to perform a test action. $D_{tgt}$ includes a joint value group $J_{tgt}$ and a coordinate value group $X_{tgt}$ of the end effector. Typically, $D_{tgt}$ can be generated by causing the transfer source robot to act several times randomly and acquiring some pairs of coordinate value of the end effector and the joint value corresponding to the coordinate value. In this case, the size of $D_{tgt}$ may be extremely smaller than the size of $D_{src}$. In other words, the number of action trials of the transfer destination robot may be smaller than the number of action trials of the transfer source robot.

Assume in this embodiment that $D_{tgt}$ is generated in advance and the transfer destination action information acquisition unit 102 acquires $D_{tgt}$ from the input device or the storage device.

A correction unit 103 performs processing for modifying $D_{src}$ into $\hat{D}_{tgt}$ by using $D_{tgt}$. In this embodiment, the correction unit 103 performs modification processing using Transfer by SOM-algorithm.

An output unit 104 outputs $\hat{D}_{tgt}$ which is generated by the correction unit 103 to the outside. The transfer destination robot acquires $\hat{D}_{tgt}$ which is output from the output unit 104, and acts based on this value, thereby making it possible to acquire an action similar to that of the transfer source robot.

Figure 2:
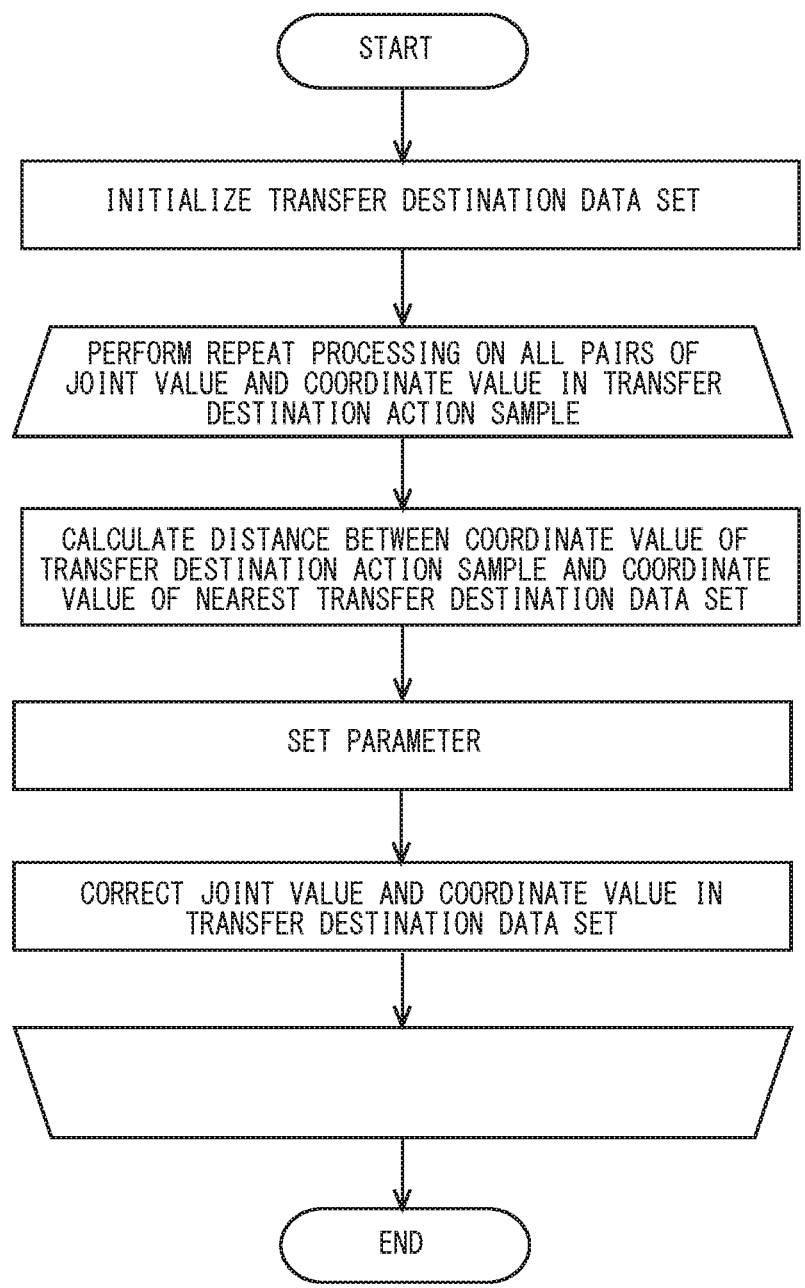
FIG. 2 is a flowchart showing an action of the action transfer device 100 according to the first embodiment.

Subsequently, an action of the action transfer device 100 according to the first embodiment of the present invention will be described with reference to the flowchart of FIG. 2. Note that an algorithm shown in FIG. 3 is an implementation example of processing indicated by the flowchart.

S101: Initialization of a Transfer Destination Data Set

The transfer source action information acquisition unit 101 acquires the data set $D_{src}$ for the transfer source.

The correction unit 103 generates $\hat{D}_{tgt}$ as the transfer destination data set. In this case, a value that is the same as $D_{src}$ is set as an initial value (FIG. 3, second line).

S102: Repeat Processing for all Pairs of Joint Values and Coordinate Values of a Transfer Destination Action Sample The transfer destination action information acquisition unit 102 acquires the action sample $D_{tgt}$ for the transfer destination robot.

The correction unit 103 repeatedly executes the processing of S103 and subsequent steps for each pair of the joint value $J_{tgt}$ and the coordinate value $X_{tgt}$ which are included in $D_{tgt}$.

S103: Calculate a Distance Between the Coordinate Value of the Transfer Destination Action Sample and the Nearest Coordinate Value of the Transfer Destination Data Set The correction unit 103 searches the coordinate value $\vec{x}_{nearest}$ which is nearest the coordinate value $\vec{x}_{tgt}$ which is included in the action sample $D_{tgt}$ of the transfer destination robot, from the data set $\hat{D}_{tgt}$ of the transfer destination, and calculates a distance $d_{nearest}$ between the both coordinate values (FIG. 3, third and sixth to eighth lines).

More specifically, the correction unit 103 first searches, from the joint value group $\hat{J}_{tgt}$ in the data set of the transfer destination, the coordinate value $\vec{J}_{nearest}$ which is nearest $\vec{J}_{tgt}$ which is included in the action sample $D_{tgt}$ of the transfer destination robot (FIG. 3, sixth line).

Then, the correction unit 103 searches $\vec{x}_{nearest}$ which is a pair of $\vec{J}_{nearest}$ from the data set $\hat{D}_{tgt}$ of the transfer destination (FIG. 3, seventh line). Further, the correction unit 103 calculates the distance $d_{nearest}$ between $\vec{x}_{tgt}$ and $\vec{x}_{nearest}$ FIG. 3, eighth line). In this manner, the joint value space is first calculated. This is because a plurality of joint values corresponding to a certain coordinate value may be present. In this case, if the calculation is started from the coordinate value space, the joint value corresponding to the coordinate value cannot be searched.

S104: Parameter Setting

In this case, the correction unit 103 may set a parameter relating to modification processing for $\hat{D}_{tgt}$ (FIG. 3, fourth and fifth lines). In this embodiment, a parameter for setting characteristics of Sigmoid function (described later) used for the modification processing can be set. The speed of modification processing (learning processing) can be adjusted by changing the characteristics of the Sigmoid function. Note that this parameter may be arbitrarily set.

S105: Correct Joint Values and Coordinate Values in a Transfer Destination Data Set The correction unit 103 performs processing for modifying the data set $\hat{D}_{tgt}$ of the transfer destination. Specifically, all coordinate values $\vec{x}_i$ which are included in $\hat{D}_{tgt}$ are corrected to thereby optimize mapping of the joint value $\vec{J}_i$ and the coordinate values for the transfer destination robot (FIG. 3, ninth to twelfth lines).

More specifically, the correction unit 103 first calculates a distance $d_j$ between the joint value $\vec{J}_i$ which is included in $\hat{D}_{tgt}$ and $\vec{J}_{tgt}$ (FIG. 3, tenth line). Then, the correction unit 103 calculates the difference $\Delta\vec{x}_i$ between $\vec{x}_i$ and $\vec{x}_{tgt}$ (FIG. 3, eleventh line). Further, the correction unit 103 corrects $\vec{x}_i$ by the following update formula using $d_j$, $\Delta\vec{x}_i$ and the distance $d_{nearest}$ calculated in S103 (FIG. 3, twelfth line).

$$\vec{x}_i = \vec{x}_i + 4sgm(a, -d_j)sgm(b, -d_{nearest})\Delta\vec{x}_i$$

It should be noted herein that in the above-mentioned update formula, information about the joint value space is added when the coordinate value space is updated on the basis of the SOM update formula of the related art. This is because, unlike the SOM of the related art, the present invention need to handle a plurality of spaces such as the joint value space and the coordinate value space.

In this embodiment, the action transfer device 100 modifies the data set for the transfer source robot using Transfer by SOM-algorithm, thereby generating a data set optimized for the transfer destination robot. In this modification processing, action samples that are acquired in the transfer destination robot and are less than the action samples included in the data set are used. Thus, the transfer destination robot can acquire the action of the transfer source robot even if a large number of action samples are not obtained in the transfer destination robot. In other words, an equivalent action can be implemented and the action is transferred.

Further, in this embodiment, the update formula obtained by modifying the SOM of the related art and two spaces with different properties are taken into consideration at the same time is introduced. Consequently, the embodiment provides a method appropriate for problem setting or a problem to be solved, i.e., action transfer between robots.

Further, according to this embodiment, the action transfer can be achieved with a smaller amount of calculation than that of the related art. In particular, since the number of learning samples in the transfer destination robot is smaller than that in the related art, the amount of calculation can be remarkably reduced.

<Second Embodiment>

Transfer by error propagation according to the second embodiment is a method for calculating an error between $D_{src}$ and $D_{tgt}$ and modifying the coordinate value space $X_{src}$ for the transfer source robot by using the error value. In other words, the error value calculated using a small number of action samples is propagated to peripheral data in $D_{src}$, thereby performing modification. Specifically, for each sample in the action sample data $D_{tgt}$ obtained in the transfer destination robot, similar actions are searched in the data set $D_{src}$ for the transfer source robot. Further, an error in the coordinate values of the end effector corresponding to the both actions is calculated. Furthermore, the error is propagated to the data in $D_{src}$ having a similar joint value, thereby modifying the coordinate value space.

A detailed method for obtaining $\hat{D}_{tgt}$ using Transfer by Error propagation is disclosed below.

The configuration of the action transfer device 100 according to the second embodiment is similar to that of the first embodiment, and thus the description thereof is omitted.

Figure 4:
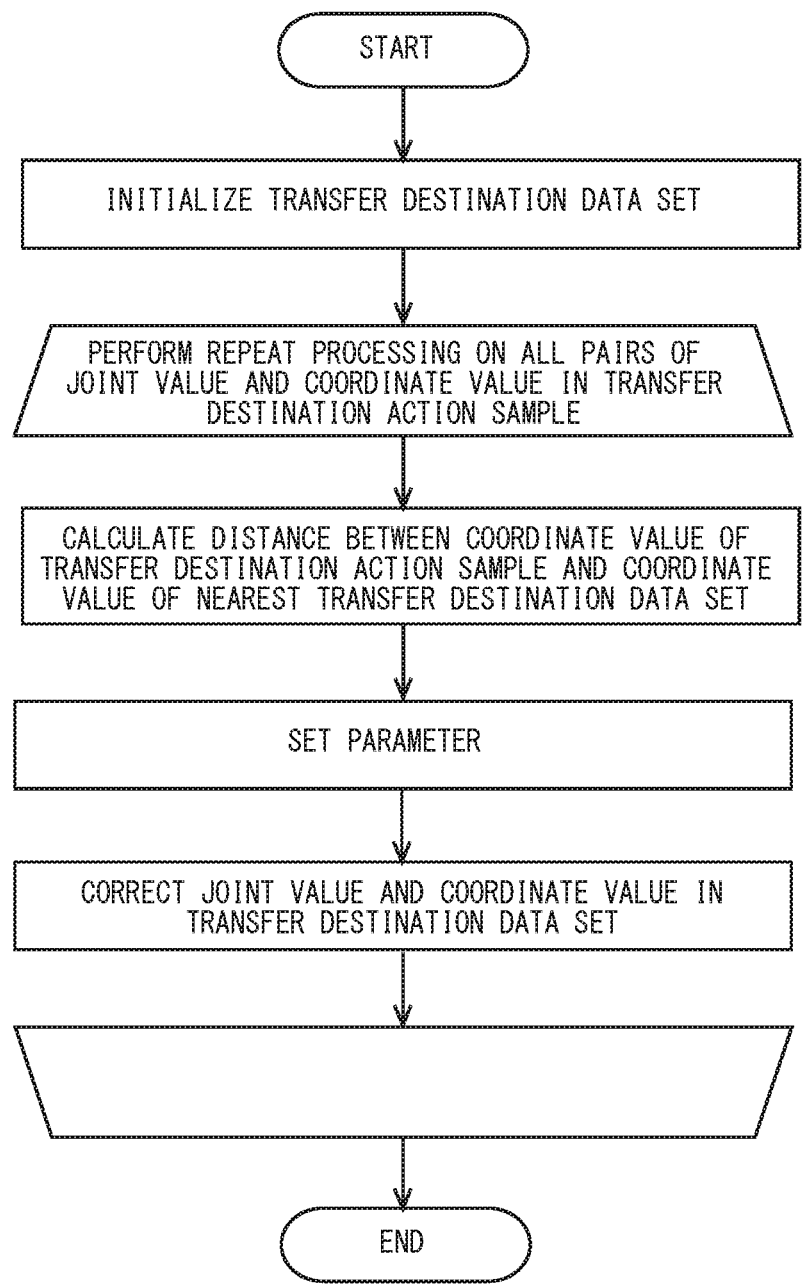
FIG. 4 is a flowchart showing an action of the action transfer device 100 according to a second embodiment.

Subsequently, the action of the action transfer device 100 according to the second embodiment of the present invention will be described with reference to the flowchart of FIG. 4. Note that an algorithm shown in FIG. 5 is an implementation example of processing shown in the flowchart.

S201: Initialization of a Transfer Destination Data Set

Like in the first embodiment, the transfer source action information acquisition unit 101 acquires the data set data set $D_{src}$ for the transfer source. Further, the correction unit 103 generates $\hat{D}_{tgt}$ as the transfer destination data set. In this case, a value that is the same as $D_{src}$ is set as an initial value (FIG. 5, second line).

S202: Repeat Processing for all Pairs of Joint Values and Coordinate Values of a Transfer Destination Action Sample Like in the first embodiment, the transfer destination action information acquisition unit 102 acquires the action sample $D_{tgt}$ for the transfer destination robot. The correction unit 103 repeatedly executes the processing of S203 and subsequent steps on each pair of the joint value $J_{tgt}$ and the coordinate value $X_{tgt}$ included in $D_{tgt}$.

S203: Calculate a Difference Between the Coordinate Value of the Transfer Destination Action Sample and the Nearest Coordinate Value of the Transfer Destination Data Set The correction unit 103 searches, from the data set $\hat{D}_{tgt}$ of the transfer destination, the nearest coordinate value $\vec{x}_{nearest}$ of the coordinate value $\vec{x}_{tgt}$ which is included in the action sample $D_{tgt}$ of the transfer destination robot, and calculates the error $\Delta\vec{x}_{nearest}$ between the both values (FIG. 5, third and fifth to seventh lines).

More specifically, the correction unit 103 first searches, from the joint value group $\hat{J}_{tgt}$ in the data set of the transfer destination, the nearest joint value $\vec{J}_{nearest}$ in the joint value space of the joint value $\vec{J}_{tgt}$ which is included in the action sample $D_{tgt}$ for the transfer destination robot (FIG. 5, fifth line). Then, the correction unit 103 searches a pair $\vec{x}_{nearest}$ of $\vec{J}_{nearest}$ from the data set $\hat{D}_{tgt}$ of the transfer destination (FIG. 5, sixth line). Further, the correction unit 103 calculates an error $\Delta\vec{x}_{nearest}$ between the current input $\vec{x}_{tgt}$ and $\vec{x}_{nearest}$ (FIG. 5, seventh line). Also in this case, like in the first embodiment, the calculation for the joint value space is carried out first.

S204: Parameter Setting

In this case, the correction unit 103 may set a parameter relating to modification processing for $\hat{D}_{tgt}$ (FIG. 5, fourth line). Also in this case, like in the first embodiment, the speed of the modification processing (learning processing) can be adjusted by changing the characteristics of the Sigmoid function.

S205: Correct Joint Values and Coordinate Values in a Transfer Destination Data Set The correction unit 103 performs processing for modifying the data set $\hat{D}_{tgt}$ of the transfer destination. Specifically, all coordinate values $\vec{x}_i$ which are included in $\hat{D}_{tgt}$ are corrected to thereby optimize mapping of the joint value $\vec{J}_i$ and the coordinate values for the transfer destination robot (FIG. 3, ninth to twelfth lines).

More specifically, the correction unit 103 first calculates the distance $d_j$ between the joint value $\vec{J}_i$ which is included in $\hat{D}_{tgt}$ and $\vec{J}_{tgt}$ (FIG. 3, ninth line). Then, the correction unit 103 corrects $\vec{x}_i$ by the following update formula using $d_j$ and the displacement $\Delta\vec{x}_{nearest}$ which is calculated in S103 (FIG. 5, tenth line). Thus, the above-mentioned displacement is also propagated to other coordinates.

$$\vec{x}_i = \vec{x}_i + 2sgm(a, -d_j)\Delta\vec{x}_{nearest}$$

In this case, the above-mentioned update formula is obtained by modifying the update formula of the first embodiment. As will be described in detail later, in Transfer by SOM-algorithm of the first embodiment, modification processing is performed in such a manner coordinate values other than $\hat{D}_{tgt}$ approach the input coordinate values (the coordinate value group $X_{tgt}$ of the action sample $D_{tgt}$ of the transfer destination). On the other hand, in Transfer by Error propagation of the second embodiment, an error between the input coordinate value and the corresponding coordinate value in $\hat{D}_{tgt}$ is also propagated to other coordinate values, and modification is performed so as to move based on the error. In view of the problem setting, i.e., the action transfer of robots, in the present invention, modification of the data set by the update formula of the second embodiment is more efficient.

According to this embodiment, the action transfer device 100 can achieve the action transfer more appropriately and more efficiently as compared with the first embodiment.

<Experiments>

In order to verify the advantageous effects of the action transfer methods according to the first and second embodiments, the inventor conducted two types of experiments. One of the experiments uses a two-axis robot with an end effector acting on a two-dimensional plane, and the other one of the experiments uses a six-axis real robot with an end effect acting in a three-dimensional space. A quantitative evaluation is mainly conducted using the former robot, i.e., the two-axis robot, and an effectiveness evaluation is conducted using the latter robot, i.e., the six-axis robot.

<Experiment Using a Two-Axis Robot>

Figure 6:
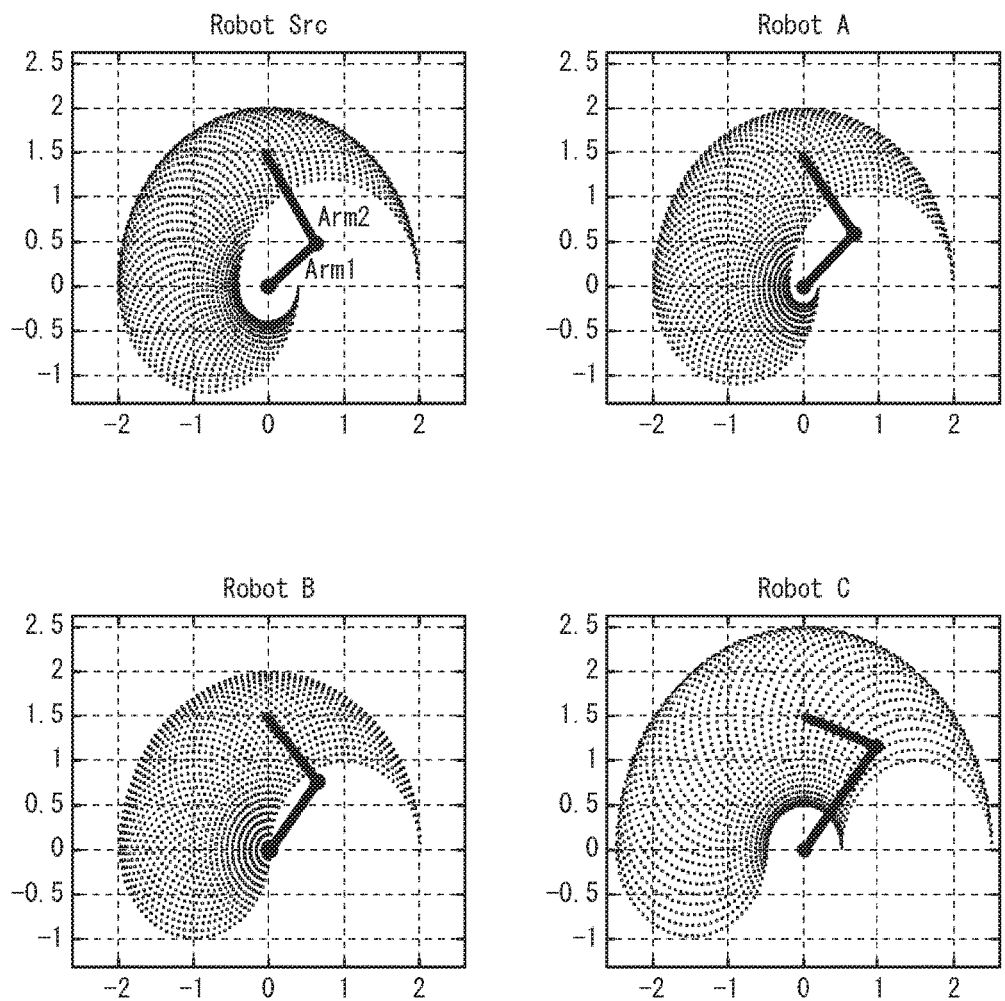
FIG. 6 is a diagram showing physical properties of a robot used for a comparative experiment.
Figure 7:
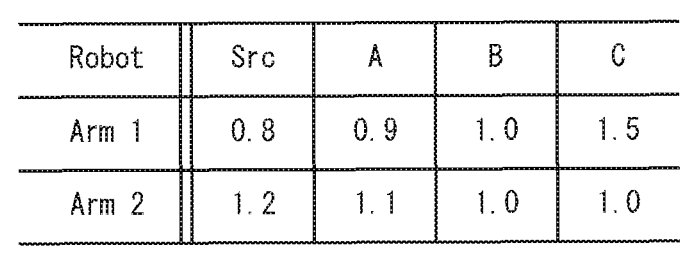

Experiment environment: A two-axis one-arm robot is created on a simulator and an action is transferred on the simulator. After that a quantitative evaluation of a positional error of the end effector is conducted. Accordingly, four types of robots with different arm lengths were prepared. FIG. 7 shows the arm length of each robot. FIG. 6 shows a space in which the robots having different arm length can act. Experiments are conducted in two patterns. One of the patterns is that the range of movement of the joint value is limited to a range from 0 to 180 degrees (this case is hereinafter referred to as "the joint value has a limit", which corresponds to FIG. 6). The other one of the patterns is that the range of movement of the joint value is limited to a range from 0 to 360 degrees (this case is hereinafter referred to as "the joint value has no limit"). When the joint value has no limit, a plurality of candidates for the joint value for bringing the end effector to an arbitrary location may be present, and thus the generation of actions for the robots is not uniform.

In this experiment, the action transfer to robots A, B, and C is carried out using a robot Src as the transfer source robot. Further, the absolute value $$\text{err} = \|f_{tgt}(\vec{J}_{ik}) - \vec{x}_{goal}\|$$

of the positional error at that time is measured. In this case, $\vec{x}_{goal}$ is a coordinate value designated as a target, and $f_{tgt}(\vec{J}_{ik})$ is a coordinate value of the end effector where the robot has actually reached.

The data set $D_{src}$ for the transfer source robot includes data of the joint values on a grid that are obtained by gradually moving the value of each joint of the robot Src by $0.0314 \approx \pi/100$[rad], and the absolute coordinate value (XY-plane) of the end effector obtained from each of the joint values. As for the number of pieces of data, 10000 samples were used when the joint value has a limit, and 40000 samples were used when the joint value has no limit.

The action sample $D_{tgt}$ for the transfer destination robot includes the joint values which are randomly set in the robots A, B, and C, and the coordinate values obtained from the respective joint values. The number of pieces of data is set to 50 samples, regardless of whether or not the joint value has a limit.

The evaluation in this experiment was carried out by conducting the experiment for moving the arm 200 times toward random targets 100 times and recording a positional error between the target and the end effector at that time. Parameters of $a_s=1$ and $a_e=0.1$ were used. These values are a variety of values optimum for the respective parameters that are obtained by preliminarily carrying out the transfer, which is likely to be most difficult, at a small scale. In this experiment, the following six pieces of experimental data were compared.

STgt: when a small amount of sample data $D_{tgt}$ is simply used as a data set for the transfer destination Lsrc: when data $D_{src}$ is simply copied and used as a data set for the transfer destination robot TSom: when transfer is performed using Transfer by SOM-algorithm TErr: when transfer is performed using Transfer by Error propagation LTgt: when a large number of action samples are obtained in the transfer destination (theoretical minimum error)

Experimental result: FIG. 9 shows a box plot of positional errors when the joint value has a limit. FIG. 10 shows a box plot when the joint value has no limit. FIG. 8 shows average values and standard deviations when the joint value has a limit (L) and when the joint value has no limit (N).

As seen from FIGS. 8 to 10, the use of Transfer by Error propagation (TErr) among several transfer methods makes it possible to suppress positional errors close to the theoretical minimum error (LTgt). This indicates that even when robots having different physical properties, such as an arm length, are used, if the transfer source robot has learned a sufficient number of samples (in this case, several tens of samples), the robots can achieve the action with about the same accuracy as that obtained when the robot has learned a large number of samples (several tens of samples), by collecting a small number of samples (50 samples) on the transfer destination robot. That is, time and effort for learning actions for each robot can be reduced and the action transfer can be performed efficiently.

Incidentally, even when Transfer by Error propagation is used, a certain number of positional errors are still present. This experiment is not sufficient to prove that the technique according to the present invention is actually effective as a robot action transfer method. Therefore, the effectiveness of the present invention in a real robot is verified as follows.

<Experiment Using a Six-Axis Real Robot>

Figure 11:
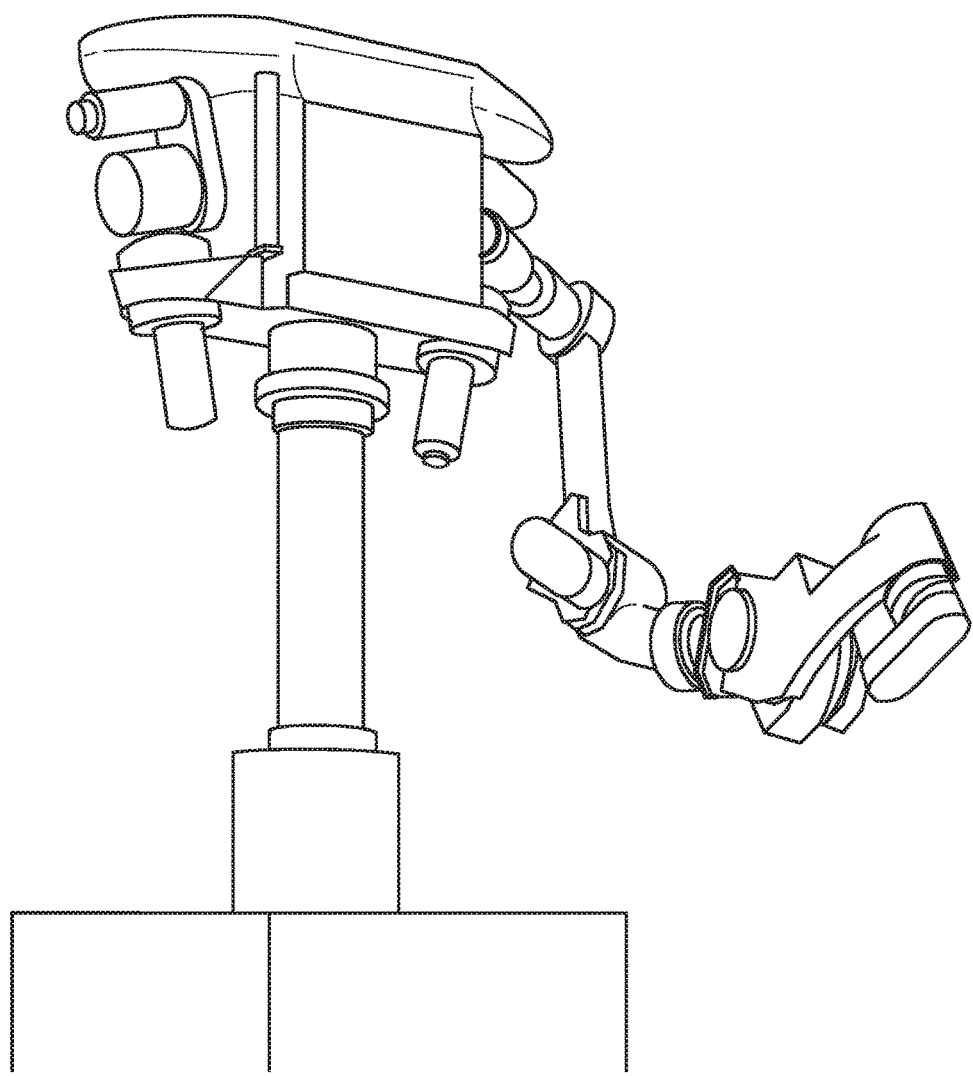
FIG. 11 is a diagram showing a robot used for a comparative experiment.
Figure 12:
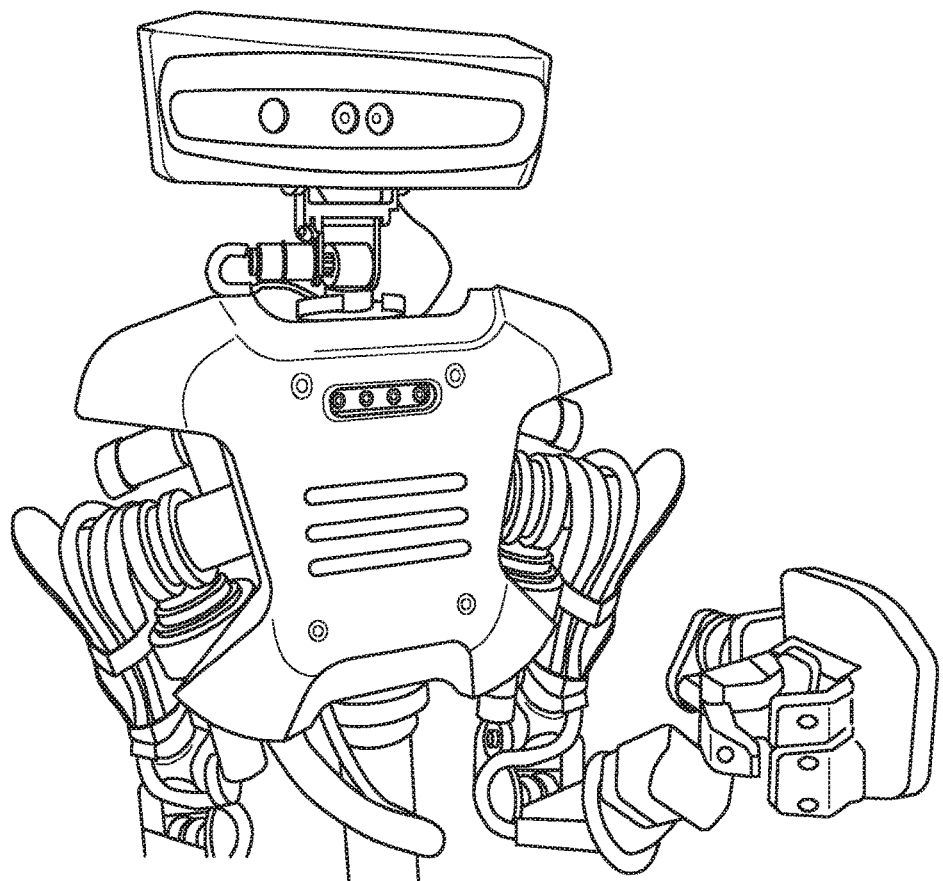
FIG. 12 is a diagram showing a robot used for a comparative experiment.

Experiment environment: In this experiment, a real robot shown in FIG. 12 is used as the transfer destination. This transfer source robot includes a six-axis left arm. As a transfer source robot for this robot, a robot with specs similar to the arm of the transfer destination is created on the simulator. FIG. 11 shows the appearance of the transfer source robot. FIG. 13 shows the lengths of the arms and wrists of this robot. In this case, two types of transfer source robots, i.e., a robot α and a robot β, were created on the simulator. The action transfer was carried out for the real robot by using the left arm of each of the transfer source robots α and β on the simulator and collecting a large number of databases.

Details regarding the data used during experiments will be described. The data set $D_{src}$ acquired by the transfer source robot on the simulator is obtained by moving each joint by $0.0157 \approx \pi/200$[rad], and the number of pieces of data is about 700,000 samples. A small number of action samples $D_{tgt}$ acquired by the real transfer destination robot were obtained by randomly moving the real robot, and 100 samples were obtained.

In this case, two types of experiments, i.e., a quantitative evaluation using a six-axis robot and a demonstration experiment using a real robot, were conducted. The former experimental method is similar to the experiment using the two-axis robot described above. In the latter experiment, the real robot is caused to carry the end effector to an arbitrary target position and to grip an object that is placed at the location in advance. At this time, the absolute coordinates of the object position can be specified using a camera and a depth sensor which are mounted on the robot.

Also in this experiment, six pieces of experimental data of STgt, Lsrc, TSom, TErr, and LTgt were compared.

Experimental result: FIG. 14 shows a box plot of positional errors of the end effector when the robots α and β are used as transfer source robots and six methods are used. FIG. 15 shows average values and standard deviations. As seen from FIGS. 14 and 15, like in the case of the two-axis robot, also in the six-axis robot, positional errors can be reduced with high efficiency by using Transfer by Error propagation. A time required for one transfer using Transfer by Error propagation is 56.8±3 [sec], which can be evaluated as a practically applicable time.

Next, an experiment for causing the real six-axis robot to grip an object placed at an arbitrary location by using information transferred from the robot β was conducted. As a result, it was confirmed that the robot can actually grip the object. Therefore, the technique according to the present invention can be evaluated as effective for the action transfer in the real environments.

<comparison between examples>

According to the above experimental results, when the action transfer is performed by Transfer by SOM-algorithm according to the first embodiment, a positional error is relatively large. On the other hand, according to Transfer by Error propagation of the second embodiment, a positional error is extremely small.

Figure 16:
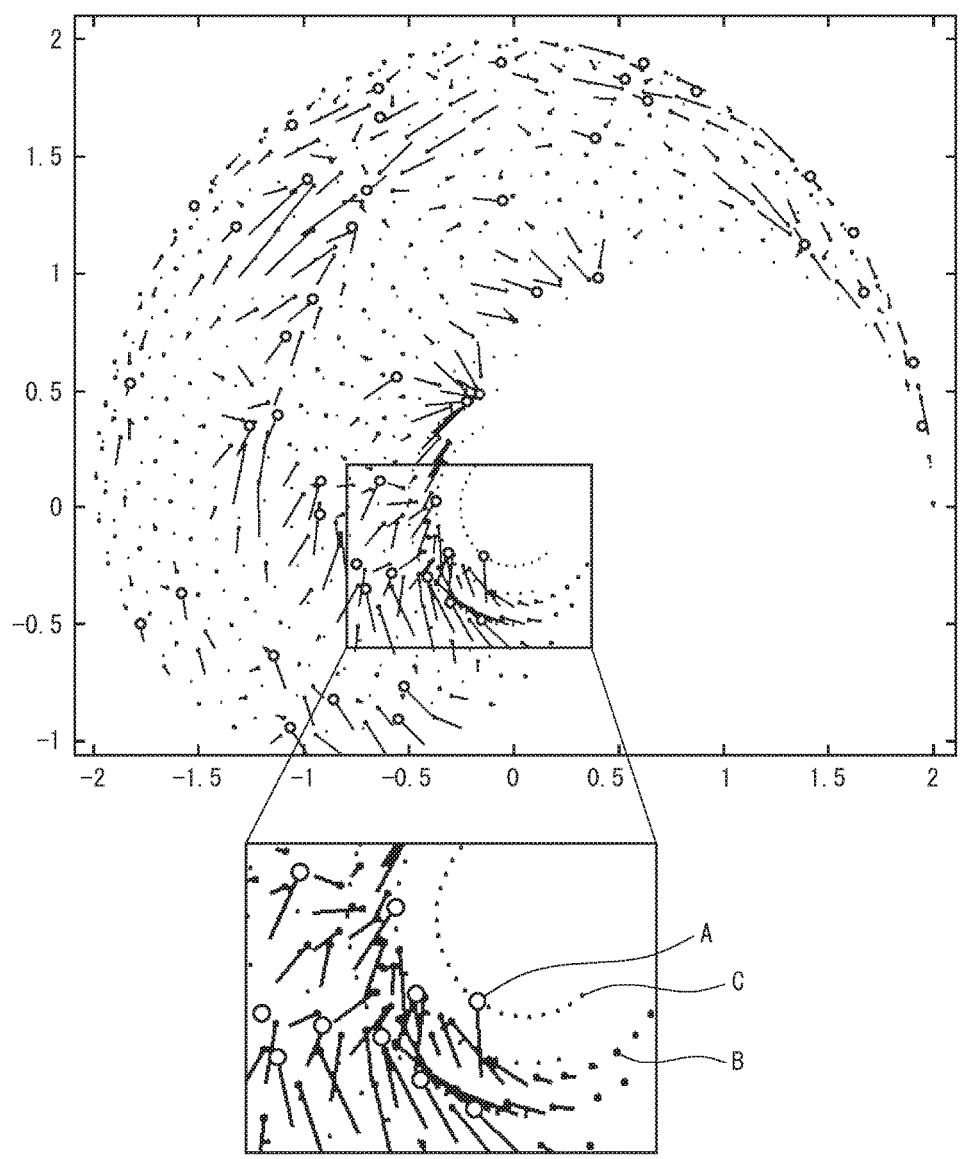
FIG. 16 is a diagram showing results of a comparative experiment.
Figure 17:
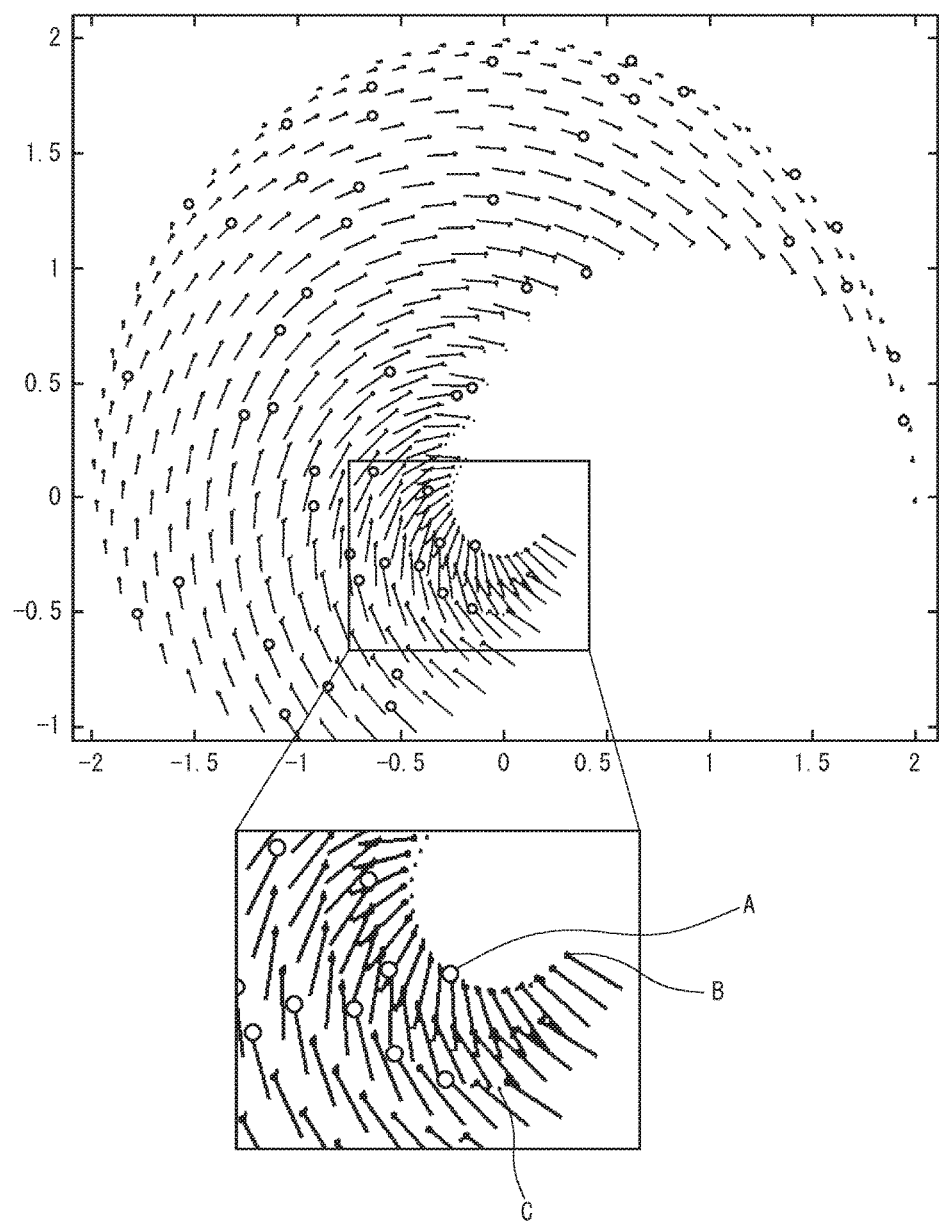
FIG. 17 is a diagram showing results of a comparative experiment.

FIGS. 16 and 17 show the absolute coordinate space of the end effector in each of two modification methods when the action transfer from the robot A is performed using a two-axis robot as the transfer destination robot. FIG. 16 shows a case where Transfer by SOM-algorithm is used, and FIG. 17 shows a case where Transfer by Error propagation is used.

Referring to FIGS. 16 and 17, each point A (represented by a circle) indicates the coordinate value $X_{tgt}$ of a small number of action samples input on the transfer destination robot, and each point B (represented by a large black circle) indicates the coordinate value $\hat{X}_{tgt}$ which is obtained after the transfer. Each line segment indicates a locus of movement of coordinate values (correction modification for a data sets) by the action transfer. Each point C (represented by a small black circle) indicates a coordinate value assuming that a large number of samples can be acquired by the transfer destination robot. In this case, a state where the point B and the point C overlap each other indicates that the transfer method can sufficiently suppress errors in the transfer source robot, or can suppress errors in the same manner as in the case where the robot has learned about a number of samples the same as that of samples learned by the transfer source robot.

As is seen from FIG. 16, in the Transfer by SOM-algorithm, the point B, which indicates the coordinate values obtained after the transfer, is moved near the point A which indicates a small number of action samples input on the transfer destination robot. This is because the SOM on which the Transfer by SOM-algorithm is based was originally proposed as a technique for modifying a network for an unknown target, and is an algorithm for modifying the network in accordance with input information.

On the other hand, as seen from FIG. 17, in the transfer-by-error propagation, an error between the point A, which indicates a small number of action samples input on the transfer destination robot, and the coordinate point on the transfer source robot, i.e., the amount of correction for the coordinate point indicated by a line segment, is propagated to peripheral coordinate points, and the coordinate point of the data set is corrected. This is because the problem setting in Transfer by Error propagation is different from that in Transfer by SOM-algorithm, and Transfer by Error propagation is intended to "transfer" information to the transfer destination from a state where the information about the transfer source having an environment similar to that of the transfer destination is obtained in advance. As means for solving this problem, in Transfer by Error propagation, data is adapted to the transfer destination by using an error between a new environment (transfer destination) and a learned environment (transfer source).

That is, to solve the problem of transferring learned data from a certain environment to an environment similar to the environment, Transfer by Error propagation is suitably used and the use of Transfer by Error propagation makes it possible to achieve the transfer with less errors.

<Other Embodiments>

Note that the present invention is not limited to the embodiments described above and can be modified as appropriate without departing from the scope of the invention. For example, in the above embodiments, the Sigmoid function is employed for mapping of coordinate values of the transfer source and coordinate values of the transfer destination. However, instead of the Sigmoid function, any function, such as an arc tangent (arctan), may be employed.

Further, the above embodiments disclose methods for transferring action information on the premise that two spaces, i.e., the joint value space and the coordinate value space, are present. However, an arbitrary number N of spaces may be provided. In this case, the above-mentioned update formula can be arbitrarily extended depending on the number of spaces. For example, coordinate values may be defined as the functions of joint values and coordinate values by adding a sensor value space. Sensor values may be, for example, data indicating an arm state (e.g., a broken or bent arm). This enables the robot to act in consideration of the sensor values. Thus, it is considered that actions can be selected and generated depending on the robot itself and the peripheral state of the robot.

While the above embodiments have been described assuming that the present invention is mainly composed of hardware, the present invention is not limited to this. Any processing can be implemented by causing a CPU (Central Processing Unit) to execute a computer program. In this case, the computer program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as an electric wire and an optical fiber, or a wireless communication line.

This application is based upon and claims the benefit of priority from Japanese patent application No. 2014-243740, filed on Dec. 2, 2014, the disclosure of which is incorporated herein in its entirety by reference.

REFERENCE SIGNS LIST

100 ACTION TRANSFER DEVICE
101 TRANSFER SOURCE ACTION INFORMATION ACQUISITION UNIT
102 TRANSFER DESTINATION ACTION INFORMATION ACQUISITION UNIT
103 CORRECTION UNIT
104 OUTPUT UNIT

The invention claimed is:

1. An action transfer device comprising:
a transfer source action information acquisition unit configured to acquire a plurality of pieces of action information about a transfer source robot;
a transfer destination action information acquisition unit configured to acquire a plurality of pieces of first action information about a transfer destination robot that has different physical characteristics from the transfer source robot; and
a correction unit configured to generate a plurality of pieces of second action information about the transfer destination robot by correcting the action information about the transfer source robot by a prescribed update formula using the first action information about the transfer destination robot, wherein
the number of the pieces of the first action information about the transfer destination robot is smaller than the number of the pieces of the action information about the transfer source robot, and
the number of the pieces of the second action information about the transfer destination robot is larger than the number of the pieces of the first action information about the transfer destination robot.

2. The action transfer device according to claim 1, wherein
the action information about the transfer source robot, the first action information about the transfer destination robot, and the second action information about the transfer destination robot include a plurality of pieces of data defined by different spaces, respectively, and
the update formula satisfies all restrictive conditions for the different spaces.

3. The action transfer device according to claim 1, wherein the correction is performed by the update formula based on an error between the first action information about the transfer destination robot and the action information about the transfer source robot.

4. The action transfer device according to claim 1, wherein the action information about the transfer source robot, the first action information about the transfer destination robot, and the second action information about the transfer destination robot include two sets of data on a robot joint value and a coordinate value corresponding to a robot specific part.

5. The action transfer device according to claim 1, wherein the correction is performed by the update formula by extending a SOM (Self-Organizing maps) algorithm to the plurality of spaces.

6. The action transfer device according to claim 1, wherein
the correction is performed by the update formula by extracting, from the action information about the transfer source robot, a second joint value located near a first joint value included in the first action information about the transfer destination robot, calculating an error between a first coordinate value included in the first action information about the transfer destination robot and corresponding to the first joint value and a second coordinate value included in the action information about the transfer source robot and corresponding to the second joint value, and propagating the error to another coordinate value included in the action information about the transfer source robot.

7. An action transfer method comprising:
a transfer source action information acquisition step of acquiring a plurality of pieces of action information about a transfer source robot;
a transfer destination action information acquisition step of acquiring a plurality of pieces of first action information about a transfer destination robot; and
a correction step of generating a plurality of pieces of second action information about the transfer destination robot by correcting the action information about the transfer source robot by a prescribed update formula using the first action information about the transfer destination robot, wherein
the number of the pieces of the first action information about the transfer destination robot is smaller than the number of the pieces of the action information about the transfer source robot, and
the number of the pieces of the second action information about the transfer destination robot is larger than the number of the pieces of the first action information about the transfer destination robot.

8. A non-transitory computer-readable medium storing a program for causing a computer to execute a method comprising:
a transfer source action information acquisition step of acquiring a plurality of pieces of action information about a transfer source robot;
a transfer destination action information acquisition step of acquiring a plurality of pieces of first action information about a transfer destination robot; and
a correction step of generating a plurality of pieces of second action information about the transfer destination robot by correcting the action information about the transfer source robot by a prescribed update formula using the first action information about the transfer destination robot, wherein
the number of the pieces of the first action information about the transfer destination robot is smaller than the number of the pieces of the action information about the transfer source robot, and
the number of the pieces of the second action information about the transfer destination robot is larger than the number of the pieces of the first action information about the transfer destination robot.

* * * * *